United States Patent [19]

Yeagle

[11] 3,867,485
[45] Feb. 18, 1975

[54] HUMIDIFIER WITH AUTOMATIC FLUSHING

[75] Inventor: Richard J. Yeagle, Hartland, Mich.

[73] Assignee: Skuttle Manufacturing Company, Milford, Mich.

[22] Filed: July 26, 1972

[21] Appl. No.: 275,274

[52] U.S. Cl.............. 261/7, 261/92, 261/DIG. 46
[51] Int. Cl............................................. B01f 3/04
[58] Field of Search........ 261/92, 97, 7, 8, DIG. 46; 126/113; 137/315; 236/44; 239/103

[56] References Cited
UNITED STATES PATENTS

| | | | |
|---|---|---|---|
| 2,580,826 | 1/1952 | Osburn et al. | 261/92 |
| 3,099,286 | 7/1963 | Powers | 137/315 |
| 3,332,672 | 7/1967 | Schipper | 261/DIG. 46 |
| 3,481,588 | 12/1969 | Lobb | 261/DIG. 46 |
| 3,490,436 | 1/1970 | Hart | 236/44 R X |
| 3,515,348 | 6/1970 | Coffman, Jr. | 239/103 |
| 3,529,810 | 9/1970 | Chilcoat | 261/92 |
| 3,565,052 | 2/1971 | Wallace | 126/113 |
| 3,640,515 | 2/1972 | Stiles | 261/92 |
| 3,643,930 | 2/1972 | Schulze, Sr. | 261/97 |

*Primary Examiner*—Tim R. Miles
*Assistant Examiner*—Richard L. Chiesa
*Attorney, Agent, or Firm*—Strauch, Nolan, Neale, Nies & Kurz

[57] ABSTRACT

A humidifier reservoir is periodically flushed for predetermined periods under control of the humidistat that controls operation of the rotating evaporator drum or other water distribution device.

9 Claims, 1 Drawing Figure

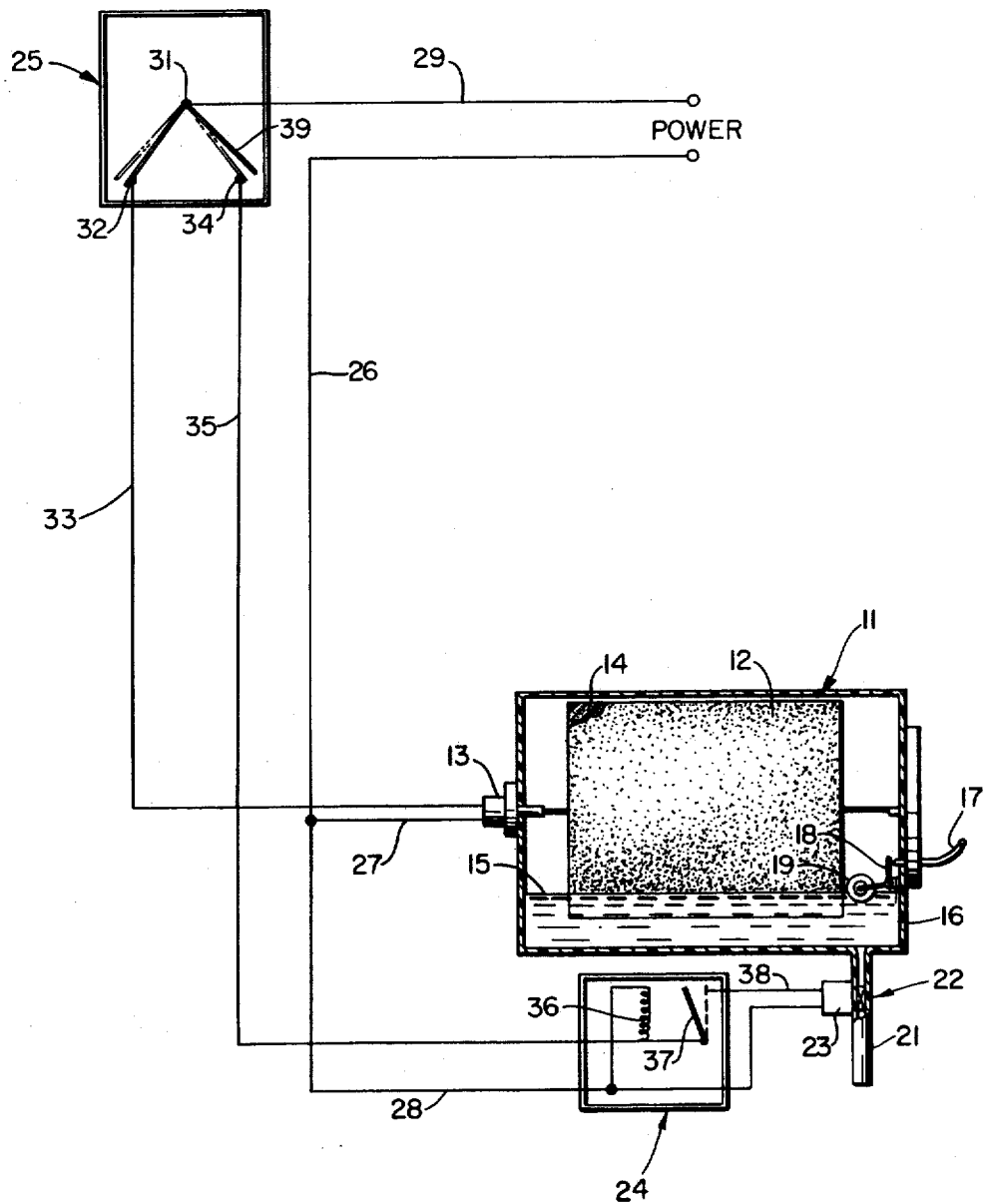

HUMIDIFIER WITH AUTOMATIC FLUSHING

This invention relates to humidifiers of the type having reservoirs adapted to contain water to be evaporated or atomized into air in an enclosed space to increase the moisture content of the air, and is particularly directed to a novel arrangement for flushing such reservoirs for maintaining a clean supply.

In its preferred embodiment the invention will be described as incorporated in a rotary drum type automatic humidifier wherein a motor driven drum rotates with its lower sector moving through a reservoir of water that is automatically maintained at a desired level by a suitable float valve control. The upper part of the drum moves across the path of air to be humidified, the water being evaporated into the air. In such humidifiers problems have arisen due to dust deposits and other solid particles filtered out of the water by the drum material or deposited by gravity which accumulate in the water and settle toward the floor of the reservoir. These solids tend to clog the pores of polyurethane pads and like water pick up surfaces on the drum with the result that gradually less water is extracted from the reservoir by the rotating drum and the humidifier eventually becomes inefficient.

In addition to such solids deposits problems have been encountered due to build up of algae and bacteria in the water should it become stagnant during long periods where the humidifier may not be operated, as during warm weather periods in the heating season.

These problems have been recognized and solutions have been proposed. It has been proposed for example to provide for automatic flushing of the reservoir as disclosed in Lobb U.S. Pat. No. 3,481,588, but the controls there are relatively complex and expensive.

The present invention is directed to periodic flushing of the reservoir and it provides a relatively simple reliable arrangement for the purpose, and such is the major object of the invention.

A further object of the invention is to provide a novel arrangement for periodically flushing the reservoir of a humidistat controlled humidifier.

A still further object of the invention is to provide for the automatic draining and refilling of a humidifier reservoir during periods wherein the water distribution element of the humidifier is inactive.

A more specific object of the invention is to provide a novel method and system for periodically flushing the water reservoir of a humidistat controlled humidifier wherein the reservoir has a drain outlet containing a valve adapted to be selectively opened under control of the humidistat. Pursuant to this object the drain valve is solenoid operated and connected to a timing device that is energized when the humidistat discontinues water distribution actuation of the humidifier.

Further objects of the invention will appear as the description proceeds in connection with the appended claims and the annexed drawings.

The drawing is a partly sectioned, partly diagrammatic view illustrating the invention incorporated in a rotary drum type evaporative humidifier system.

PREFERRED EMBODIMENTS

The drawing illustrates a conventional rotating drum type humidifier 11 wherein a rotor 12 is driven at a suitable slow speed by a motor assembly 13. The rotor carries on its periphery an annular sleeve 14 of open pore polyurethane or other water pick-up or absorbent material, and the lower sector of the sleeve moves through a body of water 15 in a reservoir section 16 within the humidifier housing. A suitable water inlet 17 provided with a valve 18 controlled by float 19 tends to maintain a constant water level in the reservoir by replacing water that has been taken out of the reservoir and evaporated for example into a hot air conduit (not shown) conventionally attached to the humidifier.

To the foregoing extent the humidifier may be conventional, and it may be the same as disclosed in Stiles U.S. Pat. No. 3,640,515 for example. The water inlet control may for example comprise the float valve arrangement of Powers U.S. Pat. No. 3,099,286.

The bottom wall of reservoir 16 is provided with an opening at which is secured a drain conduit 21 containing a normally closed solenoid valve 22. The coil 23 of valve 22 is connected to a timing device 24 which in turn is connected to a humidistat 25 disposed in the room or other space wherein the humidity of the air is to be controlled.

One side of the electric power line is a conductor 26 connected by lead 27 to the humidifier motor 13 and by lead 28 to the timing device and the solenoid valve. The other side of the power line is a conductor 29 connected to terminal 31 in the humidistat. A terminal 32 in the humidistat is connected by conductor 33 to in the humidistat, and a terminal 34 in the humidistat is connected by conductor 35 to a heater coil 36 and normally closed switch 37 of the timing device 24. A conductor 38 connects switch 37 to the valve solenoid 23. A switch element 39 in the humidistat is movable between the illustrated full and dotted line positions for energizing either the humidifier motor or the timer respectively.

In operation, assuming that there is a call for humidity the humidity sensitive element (not shown) in the humidistat, which may be of any conventional type, disposes switch element 39 in the full line position of the drawing where it connects terminal 31 with terminal 32 and the motor 13 which is thereby energized. Terminal 31 is at this point disconnected from terminal 34.

The rotor is now continually rotated by the motor to supply water into air eventually passing into the space containing the humidistat, and after the moisture content of the air in that space is satisfied by reaching a desired level of humidity the humidity sensitive element moves switch element 39 to the dotted line condition of the drawing to disconnect it from terminal 32 and deenergize motor 13 to stop rotation of the rotor.

When the humidity level has thus risen to the satisfactory level and terminal 31 is disconnected from terminal 32, terminal 31 will then be connected with terminal 34 thru switch 39, sending power to heater coil 36 and also to solenoid coil 23 thru the normally closed switch 37, indicated by dotted lines, thus opening valve 22 controlled by solenoid coil 23 and allowing water from the reservoir to drain through valve 22 and conduit 21.

After heater coil 36 heats to a predetermined setting, approximately 60 seconds, switch 37 will open automatically to the solid line position interrupting power to coil 23 and thereby closing valve 22, thus interrupting the drainage of water from the reservoir. Switch 37 may be any heat responsive switch unit, as for example a conventional bimetallic element that would deflect to assume the solid line condition shown in the drawing when heated to a predetermined degree.

As long as the humidity level is satisfied, power will continue to be supplied to heater coil 36 keeping switch 37 in the open position and thereby keeping valve 22 closed. Water will then rise in the reservoir to a level determined by float control of water inlet valve 18. Coil 36 is energized during the periods that the humidifier drum is not rotating. This condition may exist approximately 95 percent of the time the humidifier is in practical operation. However in practice it draws 0.1 amperes from a 24 volt source, which also operates motor 13. Thus the power consumed is only about 2.4 watts per hour of operation, which is very small considering the advantages gained.

When the humidity level falls below the setting of the humidistat 25, terminal 31 will be disconnected from terminal 34 and connected automatically with terminal 32, sending energy to motor 13 for rotating rotor 12, thus producing humidity.

When power is supplied to motor 13 thru humidistat 25, power is interrupted to heater coil 36, allowing switch 37 to close and allowing the flushing device 24 to assume proper sequence for the next flushing cycle which will take place when the humidity level is once again satisfied.

During the time that valve 22 is open, the water from the reservoir will drain through conduit 21. Also when the water level lowers, the water inlet valve 18 will be opened to admit fresh water. Therefore, the reservoir will be drained and flushed during the period valve 22 is open, and then after valve 22 recloses the water level in the reservoir will reassume its normal condition under control of the float valve. Since the opening to the drain is at the bottom of the reservoir the settled solids will usually be flushed out.

The invention is applicable to other types of humidifiers than the rotary drum or evaporation type. For example, the humidistat lead 33 could be connected to control the water inlet solenoid valve of an atomizing type humidifier of the type shown in U.S. patents to Hart U.S. Pat. No. 3,490,436; Wallace U.S. Pat. No. 3,565,052 and Coffman, Jr. U.S. Pat. No. 3,515,348, and the balance of the system connected to control a drain for a reservoir in such humidifiers. The term humidifier as used herein and in the claims is therefore intended to include evaporative and atomizing type humidifiers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A humidifier of the type having a water reservoir wherein the water level is maintained by automatic means and water from the reservoir is conveyed to water distribution means adapted to disperse water into air to be humidified, said water distribution means having an electrical actuating unit, a control circuit for said unit including a humidistat responsive to the air being humidified, normally closed drain means for said reservoir, and means controlled by said humidistat and operative only when said electrical actuating unit is inactive for opening said reservoir drain means for a predetermined short period to flush said reservoir and then automatically reclosing said drain means to permit said water level to be regained in the reservoir.

2. The humidifier defined in claim 1, wherein said reservoir drain means is an outlet drain passage, and said means controlled by the humidistat comprises a normally closed valve disposed in said passage that is opened during said predetermined period.

3. In the humidifier defined in claim 2, said means controlled by the humidistat including a timing device operatively connected to said valve whereby the valve remains open for only said predetermined period and is then reclosed.

4. The humidifier defined in claim 1, wherein said water distribution means is a rotating drum having a surface portion adapted to pick up water from said reservoir and said actuating unit is a motor for driving said rotor.

5. The humidifier defined in claim 4, wherein said reservoir has a drain outlet containing a normally closed solenoid valve, and said humidistat contains switching means adapted for selectively actuating either said motor or said valve.

6. The humidifier defined in claim 5, wherein a timing device is connected to control the opening period of said valve.

7. The humidifier defined in claim 6, wherein said timing device is disposed in circuit between the humidistat and said solenoid valve and includes heating means and an associated normally closed switch adapted to be opened after said heating means has been energized.

8. The humidifier defined in claim 1, wherein said humidistat comprises single pole double throw switch operatively connecting a power source either to said electrical actuating unit or to said drain opening and closing means.

9. The humidifier defined in claim 1, wherein said means for opening and reclosing said drain means is automatically actuated to flush the reservoir each time the humidistat operates to render said electrical actuating unit inactive.

* * * * *